United States Patent [19]

Beierholm et al.

[11] 4,442,394

[45] Apr. 10, 1984

[54] INVERTER CIRCUIT FOR OPERATING A SPEED-CONTROLLABLE ASYNCHRONOUS MOTOR

[75] Inventors: Hans M. Beierholm, Fynshav; Niels J. Henriksen, Nordborg, both of Denmark

[73] Assignee: Danfoss A/S, Nordborg, Denmark

[21] Appl. No.: 267,743

[22] Filed: May 28, 1981

[30] Foreign Application Priority Data

Jun. 4, 1980 [DE] Fed. Rep. of Germany ....... 3021119

[51] Int. Cl.³ .............................................. H02P 5/34
[52] U.S. Cl. .................................. 318/807; 318/803; 318/809
[58] Field of Search ............... 318/798, 800, 801, 802, 318/803, 805, 806, 807, 809, 812

[56] References Cited

U.S. PATENT DOCUMENTS

| | | | |
|---|---|---|---|
| 4,158,163 | 6/1979 | Eriksen et al. | 318/798 |
| 4,230,979 | 10/1980 | Espelage et al. | 318/801 X |
| 4,274,042 | 6/1981 | Walker et al. | 318/798 X |
| 4,276,505 | 6/1981 | Bose | 318/802 X |
| 4,314,190 | 2/1982 | Walker et al. | 318/798 |
| 4,317,074 | 2/1982 | Erth | 318/798 X |
| 4,320,331 | 3/1982 | Plunkett | 318/809 X |

Primary Examiner—J. V. Truhe
Assistant Examiner—Richard M. Moose
Attorney, Agent, or Firm—Wayne B. Easton

[57] ABSTRACT

The invention relates to an inverter circuit for operating a speed-controllable asynchronous motor. The inverter circuit is of the type wherein the voltage and frequency are substantially proportional until the nominal frequency has been reached at nominal voltage. The circuit includes an inverter, a desired value control, a D.C. voltage supply with a voltage regulator which sets the voltage depending on the desired value, and a voltage-operated frequency regulator. The circuit can be operated at frequencies above the nominal frequency to avoid damage to the inverter which would otherwise be caused by (1) high voltage due to the motor operating as a generator or by (2) the rapid reduction of the speed setting controls which is not accompanied by a corresponding drop in the voltage supplied to the inverter.

6 Claims, 4 Drawing Figures

INVERTER CIRCUIT FOR OPERATING A SPEED-CONTROLLABLE ASYNCHRONOUS MOTOR

The invention relates to an inverter circuit for operating a speed-controllable asynchronous motor, wherein the voltage and frequency are substantially proportional until the nominal frequency has been reached at nominal voltage, comprising an inverter, a desired value emitter, a D.C. voltage supply with a voltage regulator which sets the voltage depending on the desired value, and a frequency regulator which causes the frequency to follow depending on the voltage.

BACKGROUND OF THE INVENTION

In a known inverter circuit of this kind (DE-AS 16 13 776) the voltage regulator is influenced by a control quantity created by the comparison of a desired value which is predetermined as a voltage signal with a voltage value which is proportional to the existing value of the input voltage of the inverter. The existing value of the input voltage is also fed to the frequency emitter which supplies the inverter with frequency signals proportional to the voltage. In similar circuits, a departure can be made from the rigid proportionality to take into account the slip compensation, a current-dependent compensation or the like. By reason of this proportionality, the asynchronous motor can be operated at a maximum torque over the entire speed range up to the nominal frequency. There is the additional advantage that, upon a fall in the desired value for reducing the motor speed, the frequency of the motor that is now operating as a generator does not follow the desired value setting but remains linked to the existing voltage value. Consequently, as referred to the frequency of the A.C. voltage fed to the generator, the latter operates at a speed which is only slightly above the synchronous speed. As a result, there are only very small currents which cannot influence the inverter circuit. However, this manner of operation is limited to the range up to nominal frequency because the upper limit of the supplied voltage is generally equal to the nominal voltage.

Inverter circuits are also known (DE-OS 26 48 150), in which operation is possible above the nominal frequency, the motor being operated at maximum power in the range between the single and double nominal frequency. For this purpose, however, a comparatively expensive computer circuit is necessary for maintaining a constant slip frequency at every operating point.

SUMMARY OF INVENTION

The invention is based on the problem of providing a simply constructed inverter circuit of the aforementioned kind which can also be operated at frequencies above the nominal frequency but in which damage as a result of excessively rapid reduction of the desired value is avoided over the entire operating range.

This problem is solved according to the invention in that, at a desired value setting corresponding to a frequency above the nominal frequency, the frequency emitter is operable by an auxiliary signal signal which rises with the desired value and by which a higher frequency is produced despite maintaining the nominal voltage, and that, on the occurrence of an excess voltage, a discriminator transmits to the frequency emitter an error signal to raise the frequency.

In this circuit, the auxiliary signal ensures in a simple manner that the operating range also extends above the nominal frequency. Nevertheless, in this manner of operation the inverter circuit remains protected from damage that could result from excessively rapid reduction of the desired value through the generator operation of the motor. As soon as the discriminator detects the occurrence of a damaging excess voltage as a result of generator operation, it emits the error signal which increases the inverter frequency until the excess voltage returns to a permissible value. As a result, the retardation of the motor is somewhat reduced but it nevertheless reaches its new operating point at the quickest permissible speed. The circuit is very simple because, apart from the normal connecting leads, no other connections are necessary to the motor, the entire control taking place within the inverter circuit itself. This results in a very small control circuit and permits small time constants.

Advantageously, the frequency emitter has a voltage-frequency curve of which the gradient is variable depending on the auxiliary signal, and the voltage input of the frequency emitter is preceded by a summation element in which the error signal is added to the voltage. When the nominal frequency has been reached at nominal voltage, the further rise in frequency is achieved by elevating the characteristic curve. If this characteristic curve is returned too rapidly upon a fall in the desired value, the voltage signal producing the frequency is increased with the aid of the error signal.

The discriminator should respond to an excess voltage of a few percent, particularly about 5%, and it should emit an error signal which rises sharply with increasing voltage. By selecting the point of response, one can ensure that excessively high currents and voltages are avoided during generator operation. The steep characteristic curve ensures that this response value can only be slightly exceeded.

It is desirable to have an auxiliary signal emitter which is operated by the desired value and, starting with a value corresponding to the nominal voltage, emits an auxiliary signal which rises with the desired value. In this way, a uniform desired value emitter can be utilised for the entire operating range whereas the auxiliary signal is produced only above the nominal voltage.

In a preferred embodiment, the nominal voltage is predetermined by a limiter circuit following the desired value emitter and the response values of the discriminator and of the auxiliary signal emitter are fixed. This gives a particularly simple construction because the interdependent data are fixed within the circuit. This construction is suitable particularly where a relatively rigid mains voltage can be expected.

Another possibility is that the nominal voltage is predetermined by the maximum voltage of the D.C. voltage supply and the characteristic curves including the response values of the discriminator and of the auxiliary signal emitter are displaceable according to this maximum voltage. This construction is particularly suitable if the mains voltage is subject to certain fluctuations but the asynchronous motor is nevertheless to be operated at maximum torque up to each respective maximum voltage.

In a preferred embodiment, the dynamic transfer function of the discriminator and frequency emitter has a short linear rise period of 1 to 4, preferably about 2 Hz/ms, and a somewhat longer drop-off period with a time constant of about 0.1 to 0.2 s. It has been found that with such a design one can bring about exceptionally large load variations without thereby affecting safe operation. For example, the moment of inertia of the load was changed from 0 to 300 times the moment of inertia of the motor without the occurrence of damaging excess currents and voltages during generator operation.

BRIEF DESCRIPTION OF DRAWINGS

The invention will now be described in more detail with reference to preferred examples illustrated in the drawing, wherein.

DESCRIPTION OF PREFERRED EMBODIMENTS

Figure 1:
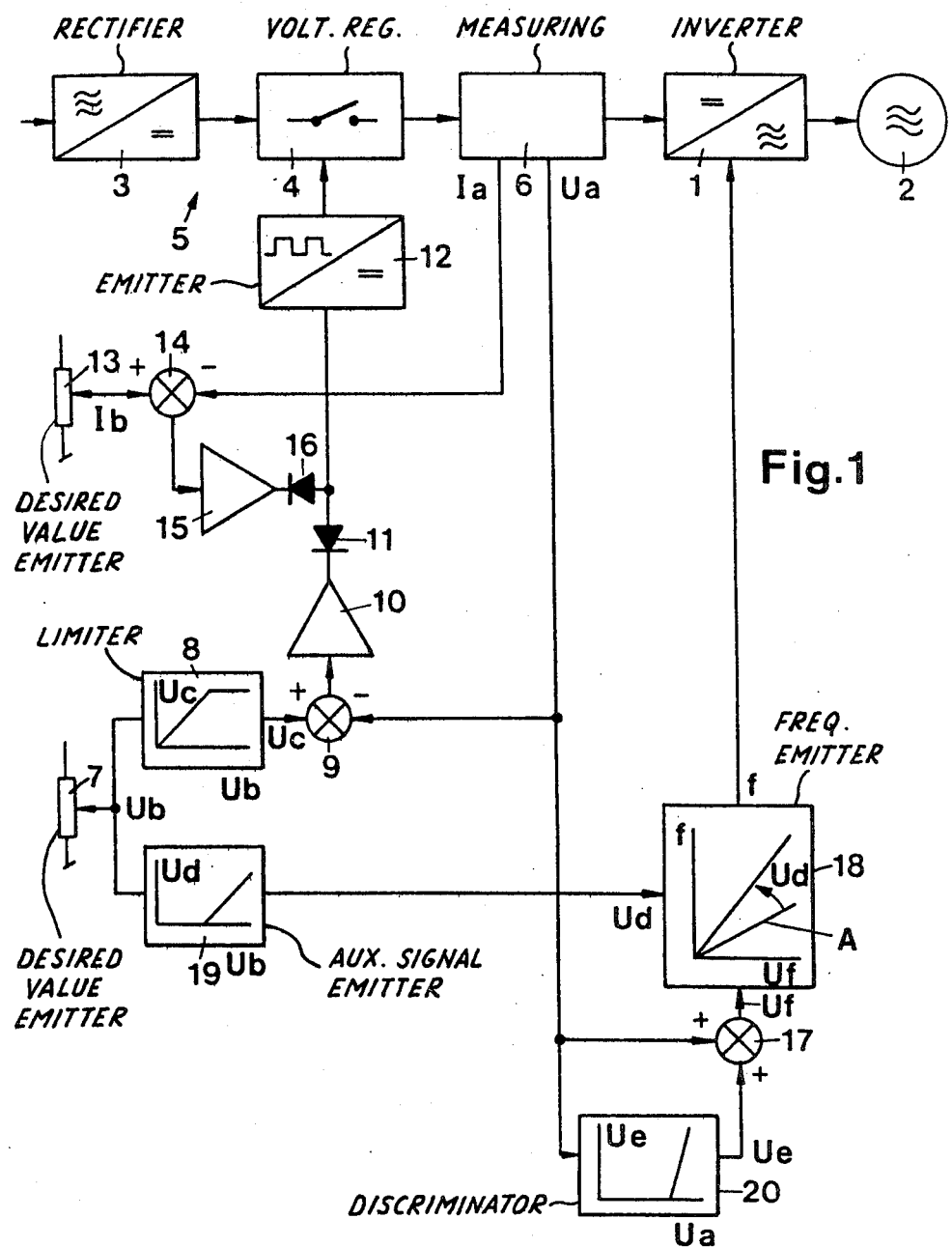
FIG. 1 is a block diagram of a first embodiment of the invention.

In the FIG. 1 embodiment, a three-phase inverter 1 is provided to operate a three-phase asynchronous motor 2. A rectifier 3 fed by A.C. mains and a voltage regulator 4 together form a D.C. voltage supply 5. The signal $I_a$ corresponding to the inverter current and a signal $U_a$ corresponding to the inverter voltage can be derived from a measuring circuit 6.

The frequency f and thus the speed of the motor 2 are set by a desired value emitter 7. This desired value emitter supplies a signal $U_b$ which, in a limiter circuit 8, is converted to a signal $U_c$ that follows the signal $U_b$ up to a fixed set nominal voltage but then remains constant. The voltage $U_a$ is compared with the signal $U_c$ in a comparator 9. The control departure is fed by way of an amplifier 10 and a diode 11 to a time-proportionally operative pulse emitter 12 which supplies switching pulses to the switch contained in the voltage regulator 4. Depending on the control departure, the switching pulses may have a variable frequency and/or a variable scanning behaviour. The maximum torque is set in a second desired value emitter 13 in that a maximum current $I_b$ is predetermined. This desired value is compared with the current $I_a$ in a comparator 14. The control departure is likewise fed to the pulse emitter 12 by way of an amplifier 15 and a diode 16 as soon as the maximum current $I_b$ is exceeded.

The voltage $U_a$ thus set with the aid of the desired value emitter 7 is fed by way of a summation element 17 to a frequency emitter 18 which emits the signals f determining the inverter frequency according to a characteristic curve A. An auxiliary signal emitter 19 is affected by the desired value signal $U_b$ and delivers an auxiliary signal $U_d$. The characteristic curve A of the frequency emitter 18 is made more steep depending on this signal. The auxiliary signal $U_d$ is zero until the desired value $U_b$ has reached the nominal value and then rises linearly. This means that the frequency f follows the voltage $U_a$ until the nominal value of this voltage and thus the nominal value $f_n$ of this frequency has been reached. During a further increase in the desired value $U_b$, the voltage $U_a$ is maintained but the frequency f continues to rise through displacement of the characteristic curve A. The asynchronous motor 2 can therefore be operated at a speed above its nominal speed.

Figure 2:
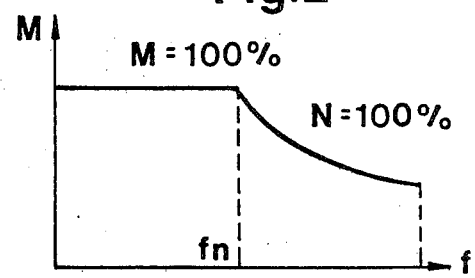
FIG. 2 shows the torque of the asynchronous motor plotted against the inverter frequency.

The manner of operation follows from the diagram of FIG. 2 where the torque M is plotted against the frequency f. Up to the nominal frequency $f_n$, the motor can be run at a maximum torque M=100% because of the simultaneous change of voltage and frequency. At higher frequencies, the torque drops because the voltage can no longer be increased but, with an optimum design of the frequency emitter 18, the motor can continue to be run at a maximum ouput N=100%.

Figure 3:
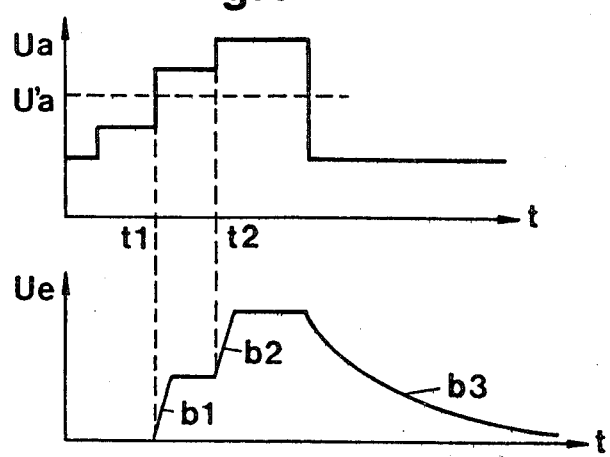
FIG. 3 illustrates the transfer function of the excess voltage discriminator and frequency emitter.

The voltage $U_a$ is also fed to an excess voltage discriminator 20 which supplies an error signal $U_e$ when the voltage $U_a$ exceeds the response value $U_a'$ (see FIG. 3) which, for example, is 5% above the nominal value of the voltage set by the limiter circuit 8. The characteristic curve of the discriminator 20 is comparatively steep. The dynamic transfer function between the input of the discriminator 20 and the output of the frequency emitter 18 has a linear gradient of for example about 2 Hz/ms. This is shown in FIG. 3. If the voltage $U_a$ exceeds the response value $U_a'$ at the instant t1, one obtains the rising flank b1 until the error signal $U_e$ corresponding to the excess voltage has been reached. If the excess voltage again rises at the instant t2, there is a further rising flank b2. The rising flank b3 extends exponentially with a time constant in the order of, say, 0.15 s.

In this way, the inverter circuit is protected over the entire operating range from excess voltages occurring during generator operation and from excess currents produced thereby. If the desired value emitter 7 is suddenly rapidly operated below the nominal frequency $f_n$, the frequency f does not follow because the latter is linked to the actual voltage $U_a$ by way of the frequency emitter 18. The existing voltage and frequency are therefore reduced substantially proportionally so that there is no danger of damage. Above the nominal frequency $f_n$, when the existing voltage $U_a$ is constant and the frequency f can therefore no longer follow it, the excess voltage discriminator 20 ensures that, on the occurrence of the excess voltage, the frequency f is increased and the excess voltage is thereby kept within such small limits that no damage can arise.

Figure 4:
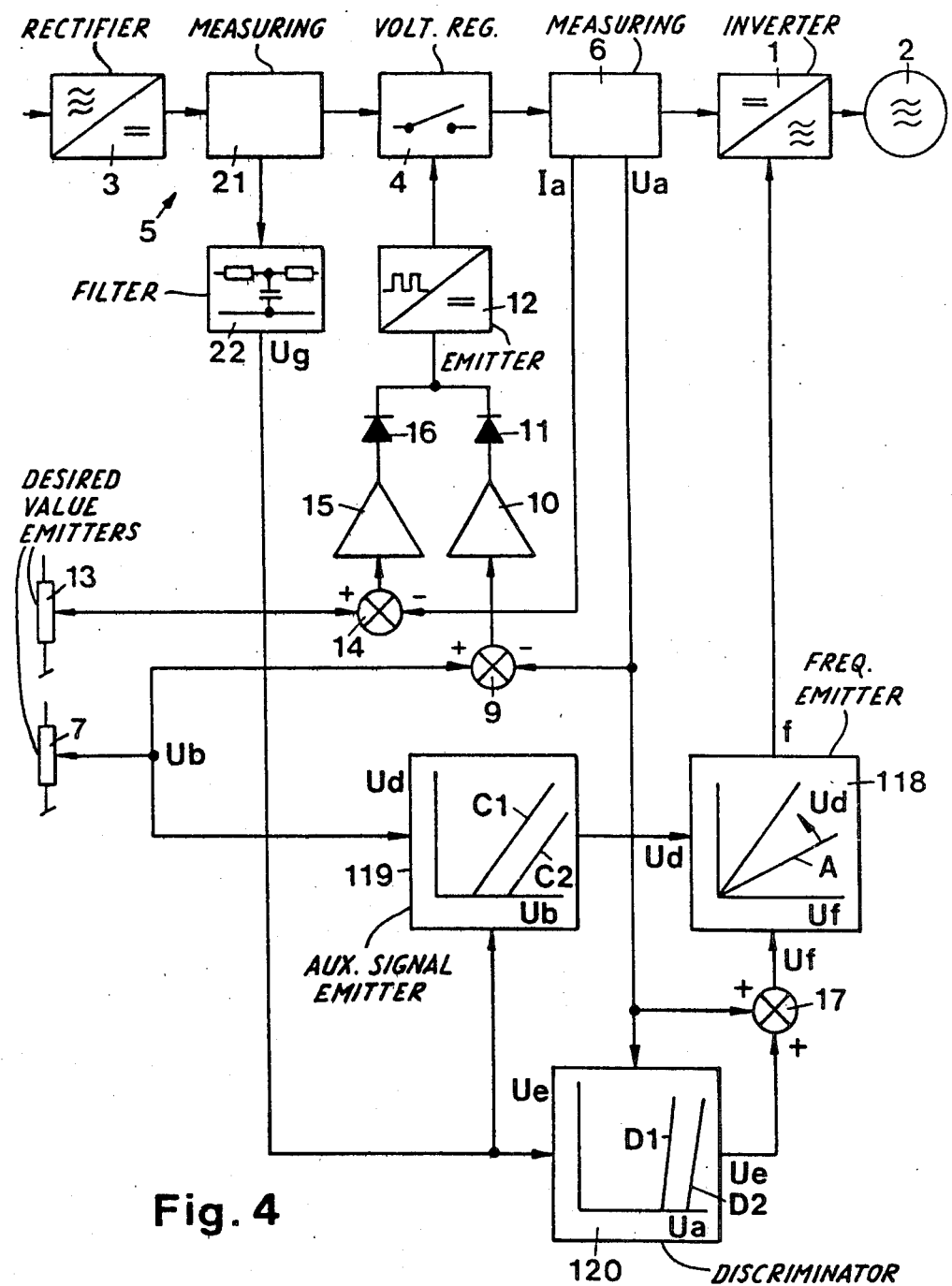
FIG. 4 is a block diagram of a different embodiment.

In the FIG. 4 embodiment, the same reference numerals as in FIG. 1 are employed for equivalent components. The main difference is that the limiter circuit 8 is omitted. Instead, the auxiliary signal emitter 119 and excess voltage discriminator 120 do not have fixed characteristic curves. The characteristic curves can be displaced depending on the mains voltage or the voltage at the output of the rectifier 3. For this purpose there is a measuring circuit 21 which feeds the voltage by way of a low-pass filter 22 as a signal $U_g$ to the auxiliary signal emitter 119 and the discriminator 120. The curves C1 and D1 correspond to a sub-normal voltage and the curves C2 and D2 correspond to an excess voltage. The nominal voltage here employed, at which the characteristic curves become effective, therefore always corresponds to the respective maximum voltage which can make the voltage supply 5 available. This means that the normal operation, i.e. without using the excess voltage discriminator 120, can in each case be conducted up to the highest possible voltage.

The illustrated circuit is also suitable for asynchronous motors other than three-phase motors. The production of the auxiliary signal $U_d$ can also be obtained other than in the manner illustrated, for example in FIG. 1 by using two mechanically coupled desired value emitters of which one produces the signal $U_c$ and the other the auxiliary signal $U_d$.

What is claimed:

1. An inverter control circuit for operating a speed-controllable asynchronous motor, comprising, control means outputting in response to frequency related voltage input settings voltage and frequency signals which are substantially proportionally related within a range limited by a predetermined nominal voltage and a corresponding nominal frequency, a voltage regulator, an inverter having input terminal means connected to said voltage regulator, frequency regulating means for said inverter having variable transfer characteristics, defined by curves, and a summating input terminal connected to said inverter input terminal means, auxiliary speed regulating means connected between said voltage input settings and said frequency regulating means for increasing said inverter frequency by alternating said frequency regulating means transfer characteristics when the setting of said control means exceeds its nominal voltage setting, excess voltage discriminating means connected between said inverter input terminal means and said summating input terminal for increasing said inverter frequency by supplementing the input at said summating input of the voltage at said inverter input terminal means, said voltage discriminating means having transfer characteristics with a threshold being a predetermined value larger than said nominal voltage.

2. An inverter circuit according to claim 1, characterized in that said frequency regulating means transfer characteristics are represented by a voltage-frequency curve of which the gradient is variable.

3. An inverter circuit according to claim 1, characterized in that said discriminating means responds to an excess voltage on the order of about 5% and emits an error signal which rises sharply with increasing voltage.

4. An inverter circuit according to claim 1, characterized in that said nominal voltage is predetermined by a limiter circuit forming a part of said control means.

5. An inverter circuit according to claim 1, including a D.C. power supply, said nominal voltage being predetermined by the maximum voltage of said D.C. power supply and said characteristic curves including the response values of said discriminating means and of said auxiliary speed regulating means are displaceable according to said maximum voltage.

6. An inverter circuit according to claim 1, wherein the dynamic transmission function of said discriminating means and said frequency regulating means has a short linear rise period of 1 to 4 and a somewhat longer drop-off period with a time constant of about 0.1 t 0.2 s.

* * * * *